United States Patent Office 2,862,417
Patented Dec. 2, 1958

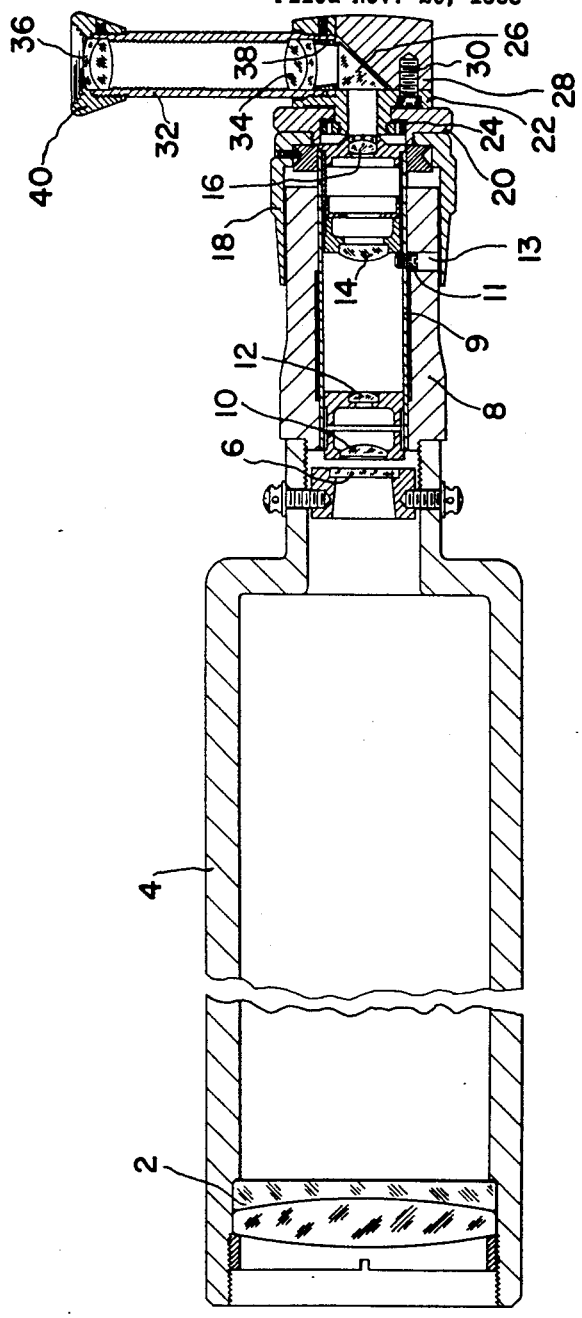

2,862,417

TELESCOPE EYEPIECE

Allister L. Baker, Denville, and Conway D. Hillman, Millburn, N. J., assignors to Keuffel & Esser Company, Hoboken, N. J., a corporation of New Jersey Application November 20, 1953, Serial No. 393,334

1 Claim. (Cl. 88—33)

This invention relates to an attachment for a telescope which permits the image formed by the telescope to be viewed at an angle to the line of sight.

In using a telescope, particularly in such applications as optical tooling work, cases frequently arise where it is inconvenient or even impossible for the observer to get his head in the proper position for looking straight through the telescope. Attachments have been used on surveying instruments such as alidades, for example, consisting only of a simple prism for bending the line of sight leaving the eyepiece. Such a prism has the disadvantage, however, that it reduces the eye distance by the length of the optical path through the prism. The observer's eye must therefore be held very close to the prism which is often inconvenient and, if the instrument is used in a crowded place, the close eye distance will limit the use of the telescope. Other devices have been provided which require the removal of the eyepiece of the telescope which is replaced by a unit including a complete eyepiece in itself as well as a prism for changing the direction of the line of sight.

The principal objects of the present invention are to overcome the disadvantages discussed above and provide an attachment for a telescope for viewing the image formed by the telescope at an angle to the line of sight of the telescope so that the image appears of the same size as if observed directly through the telescope without the attachment, which provides ample eye distance, which is relatively simple and inexpensive to manufacture, which is rotatable for viewing the image from any direction at any predetermined constant angle, which displaces the eye point a considerable distance away from the telescope to avoid such obstructions as may be near the eye end of the telescope and which does not require removal of the eyepiece of the telescope.

These and other objects of the invention and the means for their attainment will be more fully understood after referring to the following description taken in connection with the attached drawing in which:

The only figure is a view in broken sectional elevation showing a telescope with the attachment of the present invention mounted thereto.

The telescope shown in the drawing is made up of a conventional achromatic doublet objective lens 2 mounted in conventional manner within the end of a tube 4. A reticle 6 provided with an index mark is mounted at the other end of the telescope tube 4 so that the index mark lies in the focal plane of the objective lens 2. The reticle is usually transversely adjustable, as shown, so that the line of sight determined by the index mark can be made parallel to the axis of the tube 4 or any other reference. In alignment telescopes for optical tooling, means, not shown, are also conventionally provided for measuring small displacements from this line of sight. Focusing means, not shown, may also be provided to focus any target along the line of sight at the surface of the reticle 6 which is provided with the index mark.

The eyepiece is carried in a smaller diameter tube 8. In the embodiment shown, a four lens erecting eyepiece is provided which is made up of the lenses 10, 12, 14 and 16. The eyepiece is focusable on the index mark carried by the reticle 6 to suit the eye of the observer by means of the knurled ring 18 which turns the inner tube 9 to move longitudinally along the axis of the telescope by means of the screw 11 which fits into the spiral slot 13.

The attachment of the present invention is provided with a bearing 20 adapted to be attached at the eyepiece end of the telescope, as by means of the threads shown engaging internal threads on the knurled ring 18. The hollow journal 22 is mounted for rotation within the bearing 20. A threaded ring 24 engages the inner end of the journal 22 so it cannot become detached from the bearing 20. The right angle prism 26 is held against the hollow journal 22 by the cap 28 so that one surface of prism 26 is perpendicular to the bore of the hollow journal 22. The cap 28 is held onto the journal 22 by three screws 30. The tube 32 is threaded into the cap 28 perpendicular to the other right angle surface of the prism 26. The tube 32 carries the identical lenses 34 and 36 which are assembled with corresponding surfaces facing each other as shown. The lens 34 is spaced from the prism 26 by the short tube 38. A ring 40 holds the lens 36 at the other end of the tube 34.

The lens 34 is positioned so that its first focal plane coincides with the exit pupil of the telescope. The lens 36 is positioned so that its first focal plane coincides with the second focal plane of the lens 34. The dimensions of the mechanical parts are shown accordingly. This location for the lenses insures unit magnification so that the image appears of the same size as if observed through the telescope. Making the lenses 34 and 36 identical results in economical production and also simplifies the correction of aberrations since coma, oblique chromatic aberration and distortion automatically cancel. As shown, the lenses 34 and 36 are preferably achromatic cemented doublets. The eye distance is approximately equal to the focal length of the lens 36.

Although the invention has been described for a right angle eyepiece, the tube 32 being at right angles to the optical axis of the telescope. If a different predetermined constant angle is desired, the tube is mounted at the desired predetermined angle to the optical axis of the telescope and the prism 26 is altered in a manner which will be apparent to anyone skilled in the art. Instead of the prism 26, other suitable reflecting means may be provided. The system illustrated produces an image which is erect but transposed left to right. If a roof edge prism were used, the image would be both erect and untransposed horizontally and if a penta prism were used, the image would be inverted and transposed horizontally.

Having thus described the invention, what is claimed is:

An attachment for a telescope including an eyepiece for viewing the image formed by the telescope from any direction at any predetermined constant angle to the line of sight of the telescope so that the image appears of the same size as if observed directly through the eyepiece of the telescope without the attachment, said attachment providing ample eye distance, comprising a bearing provided with means cooperating with means provided on the eyepiece of the telescope for securely attaching it to the eyepiece of the telescope, a journal mounted on said bearing for rotation about the axis of the telescope, said journal including a flange, said bearing having a recess for receiving said flange and retaining said journal and bearing on said attachment while permitting relative rotation of said attachment on said bearing, said bearing having a sleeve portion for cooperation with a cooperating sleeve portion of said telescope for mounting of said bearing on said telescope whereby said attachment may rotate about the eyepiece end of said telescope, reflecting means carried by said journal for diverting the line of sight at the predetermined constant angle, a tube carried by said journal at the predetermined constant angle to the optical axis of the telescope, a pair of identical lenses mounted in said tube positioned so that corresponding surfaces of the lenses face each other, the first focal plane of said lens nearer the eyepiece of the telescope being located at the exit pupil of the telescope and the first focal plane of the other lens coinciding with the second focal plane of said lens nearer to the eyepiece of the telescope.

References Cited in the file of this patent

UNITED STATES PATENTS

| | | |
|---|---|---|
| 983,569 | Rohr | Feb. 7, 1911 |
| 1,188,844 | Schurmann | June 27, 1916 |
| 1,343,025 | Barr et al. | June 8, 1920 |
| 1,573,401 | Heine | Feb. 16, 1926 |
| 1,603,331 | Downey | Oct. 19, 1926 |
| 1,632,930 | Seidentopf | June 21, 1927 |
| 1,651,412 | Porter | Dec. 6, 1927 |
| 1,837,993 | Patterson | Dec. 22, 1931 |

OTHER REFERENCES

"The Telescope," textbook published by McGraw-Hill, New York, N. Y., 1922, pages 144 and 145 cited.